United States Patent [19]
Campbell

[11] 3,952,895
[45] Apr. 27, 1976

[54] LARGE ROUND BALE HANDLING APPARATUS

[75] Inventor: Willis R. Campbell, Ephrata, Pa.

[73] Assignee: Sperry Rand Corporation, New Holland, Pa.

[22] Filed: Dec. 5, 1974

[21] Appl. No.: 529,990

[52] U.S. Cl................................. 214/506; 214/508; 280/463
[51] Int. Cl.[2]............................................ B60P 1/16
[58] Field of Search ........... 214/505, 506, 508, 509, 214/83.26; 198/7 R, 7 BL, 11, 13; 280/462, 463

[56] References Cited
UNITED STATES PATENTS

| | | | |
|---|---|---|---|
| 2,316,397 | 4/1943 | Briscoe | 280/463 |
| 2,429,492 | 10/1947 | Scranton | 280/462 X |
| 2,518,303 | 8/1950 | Godley et al. | 280/462 X |
| 2,593,023 | 4/1952 | Haase | 198/11 |
| 2,924,466 | 2/1960 | Johnson | 280/462 |
| 3,012,682 | 12/1961 | Williamson | 214/506 X |
| 3,120,887 | 2/1964 | Holcer | 198/7 BL |
| 3,127,973 | 4/1964 | Scott | 198/7 BL |
| 3,185,330 | 5/1965 | Buckner | 214/506 |
| 3,832,837 | 9/1974 | Burkhart et al. | 280/463 X |

*Primary Examiner*—L. J. Paperner
*Attorney, Agent, or Firm*—John R. Flanagan; Frank A. Seemar; Joseph A. Brown

[57] ABSTRACT

An apparatus for handling large round bales or the like includes a transverse mobile frame and an elongated bed assembly pivotally mounted about a generally horizontal axis generally intermediately between its opposite ends to the frame. A hydraulic cylinder and linkage assembly is provided for actuating pivotal tilting of the bed assembly between a horizontal position, a rearwardly inclined position, and a forwardly inclined position and for supporting the bed assembly at such positions. Means is provided movably mounted on the bed assembly for delivering a bale from a field to the forward end of the bed assembly when it is disposed in its rearwardly inclined position and for moving the bale toward the rear end of the bed assembly. Further, the apparatus includes an elongated draft member pivotally mounted at one end about a vertical axis to the frame and a hydraulic cylinder for actuating pivoting of the draft member and the frame relative to each other for moving the bed assembly and frame between a transport position and a field operating position laterally displaced from the transport position and the towing vehicle to which the draft member is attached at its opposite end for towing the apparatus across the field. Also, matable latch elements are provided on the bed assembly and draft member for coupling the bed assembly to the draft member when the bed assembly is moved to its transport position and disposed at its horizontal position.

8 Claims, 15 Drawing Figures

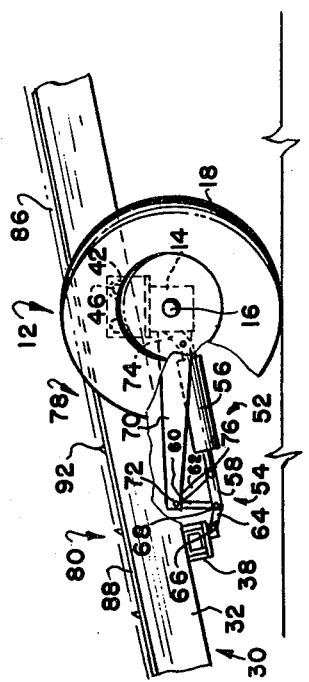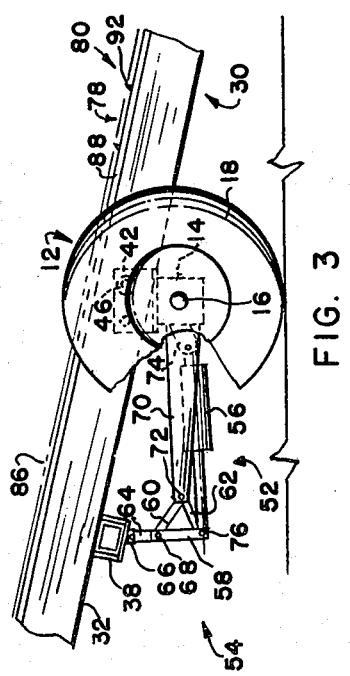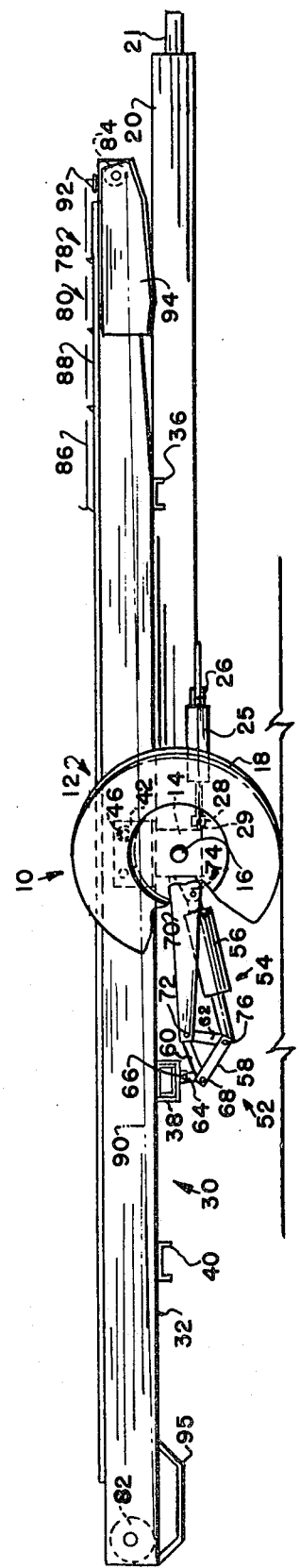

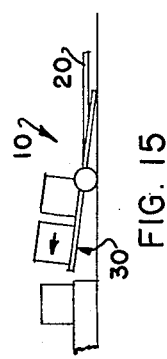
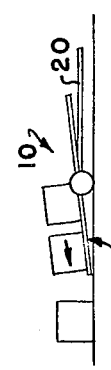
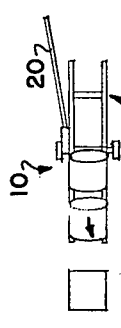
FIG. 15
FIG. 14
FIG. 13
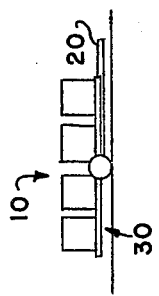
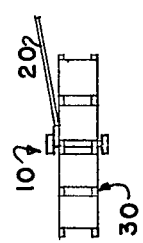
FIG. 11
FIG. 12
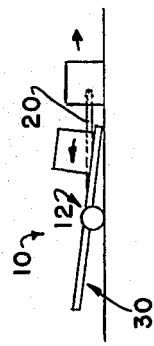
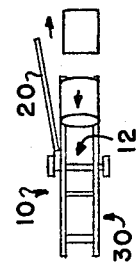
FIG. 9
FIG. 10
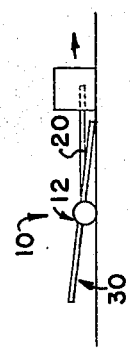
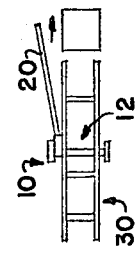
FIG. 7
FIG. 8

LARGE ROUND BALE HANDLING APPARATUS

CROSS REFERENCES TO RELATED APPLICATIONS

Reference is hereby made to the following co-pending U.S. applications dealing with related subject matter and assigned to the assignee of the present invention:

1. "Large Round Bale Handling Apparatus" by Willis R. Campbell et al., U.S. application Ser. No. 529,982, filed Dec. 5, 1974.
2. "Large Round Bale Handling Apparatus" by Shaun A. Seymour, U.S. application Ser. No. 529,983, filed Dec. 5, 1974.
3. "Large Round Bale Handling Apparatus" by John K. Hale et al., U.S. application Ser. No. 529,984, filed Dec. 5, 1974.

BACKGROUND OF THE INVENTION

1. Field of the Invention

The present invention relates generally to the art of handling crop material and, more particularly, is concerned with apparatus for handling crop material packages such as large round bales or the like.

2. Description of the Prior Art

For many years now, the predominate method of harvesting crop material such as hay or the like in the United States and many other countries has been to continuously pick up the previously cut and windrowed hay and form it into small wire-or twine-tied rectangular bales with an automatic baler, the bales normally ranging in weight from approximately 50 to 125 pounds.

Over the years, the automatic baler method of harvesting hay has usually necessitated the assistance of a crew of persons, in addition to the baler operator, in handling and storing the bales. In recent years, the availability of hay harvesting labor has become more scarce and labor costs have steadily risen. However, the impact of these unfavorable conditions on the popularity of the automatic baler method has been greatly minimized during the past decade by the introduction and growing commercial acceptance of the automatic bale wagon, which was originally illustrated and described in U.S. Pat. No. 2,848,127 and more recently, for example, in U.S. Pat. No. 3,502,230. In many parts of the United States, the automatic baler method has been largely integrated into a completely automatic, substantially one-man hay harvesting and handling system by the aforementioned bale wagon which is believed to have assured the continued, widespread viability and soundness of the automatic baler method of harvesting hay.

However, even in view of the widespread acceptance of the automatic baler method and the growing acceptance of the automatic bale wagon, other alternative methods of harvesting hay have periodically been proposed and introduced over the years.

One alternate method recently introduced utilizes a hay roll forming machine or baler which picks up loose windrowed hay or the like and forms it into a large round bale or roll normally ranging in weight from approximately 600 to 1500 pounds, in axial length from approximately 4½ to 5½ feet and in diameter from approximately 4½ to 6 feet. This large round bale method of harvesting hay has been realizing considerable commercial acceptance in various regions of the United States. The success of this method is in part due to the acceptable moisture shedding and weathering attributes of the large roll when it is left resting in the field. Such attributes eliminate the necessity for immediate removal of the rolls from the field after they have been formed and deposited there by the baler, as is ordinarily required in the utilization of the small rectangular bale method in order to protect such bales from the sudden onset of inclement weather which frequently occurs in most regions of the country during the hay harvesting season.

While such attributes eliminate the need for the farmer to devote immediate attention to handling the large bales and thereby allow removal, if desired, at a later time during slack periods, efficient handling methods must be devised in order to make the large round bale or roll method feasible as a one-man hay harvesting and handling system for the large farmer. Since the size of such bales do not lend themselves to being handled by the manual labor of several persons, let alone one man, some mechanical means for handling them must be provided.

Single large round bale handling units currently available, such as three-point hitch, tractor mounted rear end loaders and tractor mounted front end loaders, are believed to be adequate for a farmer that has just a few bales to move. However, such units are uneconomical and inefficient for farming operations where large numbers of these bales must be removed from the field, transported to distant feedlots or storage areas and further handled at such locations in carrying out livestock feeding operations.

SUMMARY OF THE INVENTION

The present invention relates to an apparatus which provides an efficient and economical means for handling a plurality of crop material packages, such as large round bales or the like, and thereby integrates the large roll baler method of hay harvesting into a completely automatic, substantially one-man harvesting and handling system.

The apparatus of the present invention includes a transverse mobile frame and a bed assembly pivotally mounted about a generally common horizontal axis generally intermediately of its opposite ends to said frame. Means, preferably in the form of a hydraulic cylinder and linkage assembly, is provided for actuating pivotal tilting of the bed assembly about the horizontal axis relative to the frame between a generally horizontal position and a rearwardly inclined position in which forward end of the bed assembly is disposed adjacent the field. The means actuating pivotal tilting of the bed assembly is also capable of supporting the bed assembly at either of the horizontal and rearwardly inclined positions relative to the frame.

The apparatus further includes means movably mounted on the bed assembly for delivering a bale or the like from the field to the forward end of the bed assembly when the bed assembly is disposed in its rearwardly inclined position and for moving the bale or the like along the bed assembly toward rear end thereof. Means is provided for driving the movable means.

Still further, the apparatus includes an elongated draft member pivotally mounted at one end about a generally vertical axis to the frame and adapted at the other end for attachment to a vehicle for towing the apparatus across the field. Also, means, preferably in the form of a hydraulic cylinder, is provided for actuating pivoting of the draft member and the mobile frame relative to each other about the vertical axis for moving the bed assembly and frame between a transport position and a field operating position laterally displaced from the transport position and the towing vehicle. Additionally, means, preferably in the form of matable latch elements, are provided on the draft member and bed assembly for coupling the bed assembly to the draft member when the bed assembly is moved to its transport position and disposed at its horizontal position.

The means actuating pivotal tilting of the bed assembly is further capable of disposing the bed assembly in a forwardly inclined position in which the rear end of the bed assembly is disposed adjacent the field for unloading bales from the bed assembly.

The apparatus of the present invention is versatile in that it is capable of handling large round bales in any of several ways which serve the several end uses or purposes which most farmers contemplate for the bales. Specifically, the apparatus may be used to retrieve or pick up bales in the field and transport multiple numbers of them to a storage area. In those farming operations where feeding of livestock is carried out in the field or pasture instead of in feedlots, the apparatus may also be used to retrieve multiple numbers of bales which had been previously moved to a storage area, then move the bales back to a desired field location and replaced them back on the field with the same previously weathered bottom portion of the bale again resting on the field. Such controlled handling of the bales minimizes the amount of spoilage of the hay therein, which results after they have been returned to the field. Further, the apparatus is capable of retrieving multiple numbers of bales from the field or storage area and unloading them onto the bed of a truck or wagon if the farmer desires to transport the bales over greater distances than is feasible with a tractor and the retrieving apparatus itself. Also, the apparatus is capable of retrieving both newly formed bales having a solid, cylindrical form and ones which are somewhat flattened or oval in shape after they have been resting for several months, with a minimal of disturbance to the shape and appearance of either.

These and other advantages and attainments of the present invention will become apparent to those skilled in the art upon a reading of the following detailed description when taken in conjunction with the drawings in which is shown and described an illustrative embodiment of the invention.

BRIEF DESCRIPTION OF THE DRAWINGS

In the course of the following detailed description reference will be frequently made to the attached drawings in which:

FIG. 2 is an elevational view as seen from the right side of the apparatus of FIG. 1, showing the bed assembly of the apparatus disposed in a generally horizontal position;

FIG. 3 is an elevational view of a fragmentary portion of the apparatus as seen in FIG. 2, but showing the bed assembly in a rearwardly inclined position;

FIG. 4 is an elevational view of a fragmentary portion of the apparatus as seen in FIG. 2, but showing the bed assembly in a forwardly inclined position;

FIGS. 7 through 15 are schematic representations of various stages in the bale handling operations carried out by the apparatus.

DETAILED DESCRIPTION OF THE INVENTION

In the following description, right hand and left hand references are determined by standing at the rear of the apparatus and facing in the direction of forward travel. Also, in the following description, it is to be understood that such terms as "forward," "left," "upwardly," etc., are words of convenience and are not to be construed as limiting terms.

THE BALE HANDLING APPARATUS

Figure 1:
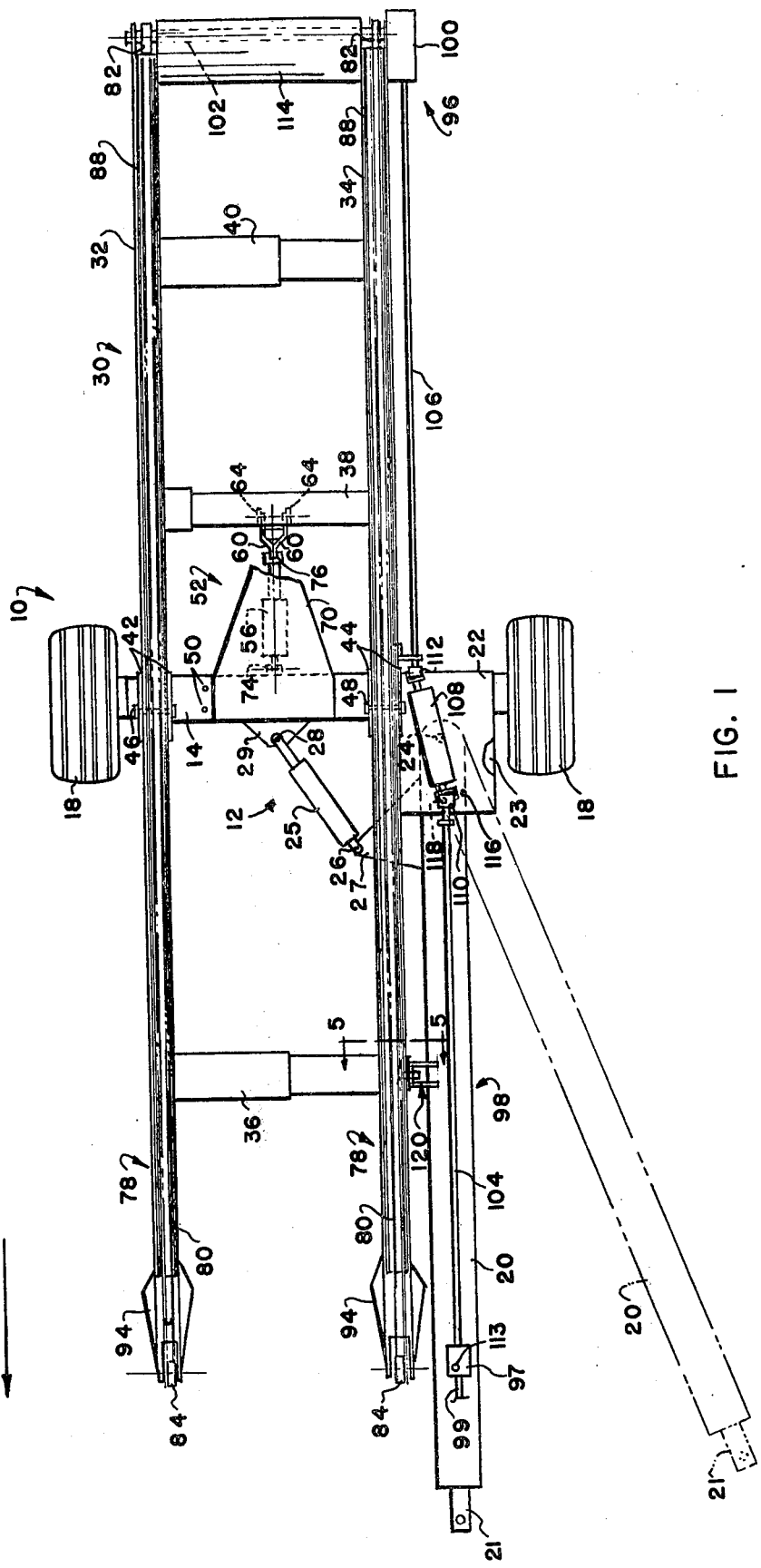
FIG. 1 is a top plan view of a bale handling apparatus embodying the principles of the present invention.

Referring now to the drawings, and particularly to FIGS. 1 and 2, there is shown an apparatus for handling crop material packages, such as large round bales or the like, the apparatus being indicated generally by numeral 10 and forming the preferred embodiment of the present invention (the apparatus being viewed from its right side in FIG. 2).

The apparatus 10 is provided with a mobile frame, generally indicated at 12, which includes a beam 14 having a tubular structure with axially aligned spindles 16 fixed at opposite end thereof and a ground wheel 18 being rotatably mounted to each of the spindles 16 about a common horizontal axis defined by the spindles 16. The ground wheels 18, therefore, mount the beam 14 so as to extend in a transverse relation to the direction of forward travel of the apparatus 10, as indicated by the arrow in FIG. 1.

The mobile frame 12 of the apparatus 10 is adapted for towing behind a vehicle, such as a tractor (not shown), by an elongated draft member or tongue 20. The draft member 20, being of a tubular construction, has a hitch element 21 fixed thereon at its forward end which is adapted for securement to the drawbar (not shown) of the towing vehicle to be located at the front of the apparatus 10. At its rear end, the draft member 20 extends between a pair of spaced apart horizontal plates 22, 23 fixed to and extending forwardly from the upper and lower sides of the frame beam 16 adjacent the left end thereof. The rear end of member 20 is mounted by a pin 24 to the plates 22, 23 for pivotal movement in relation thereto and, consequently, in relation to the frame 12 about a generally upright or vertical axis defined by the pin 24. The member 20 is not movable vertically in relation to the frame 12. Therefore, the draft member 20 and the frame 12, in effect, form a substantially rigid structure with reference to a vertical plane which structure is not rotatable about the common axis of ground wheels 18 and is disposed as seen in FIG. 2 when the draft member 20 is attached to the towing vehicle.

In order to actuate pivotal movement of the draft member 20 in relation to the frame 12 about the upright axis defined by pin 24, there is provided means, preferably being a hydraulic cylinder 25, coupled between the beam 14 of frame 12 and the draft member 20. The hydraulic cylinder 25 is of the double-acting type and is supplied with fluid under pressure through hydraulic lines (not shown) from any suitable source, such as the tractor hydraulic system. The cylinder 25 is pivotally anchored at its forward cylinder end at 26 to a bracket 27 fixed to the rearward right side of the draft member 20 and pivotally coupled at its rear piston end at 28 to a bracket 29 fixed to the front side of the frame beam 14. When the hitch 21 of the draft member 20 is attached to the towing vehicle, extension and retraction of the cylinder 25 has the effect of pivoting the frame 12 away from and toward the draft member 20.

A bed assembly, generally indicated by numeral 30, is mounted to the mobile frame 12. The assembly 30 includes a pair of elongated support members or rails 32, 34 and transverse members 36, 38, 40 which interconnect with the lower sides of the rails 32, 34 and dispose the rails 32, 34 in laterally spaced apart relationship from each other. The right rail 32 extends between a pair of upright spaced apart plates 42 mounted to the upper side of the frame beam 14 adjacent to and inwardly from the right ground wheel 18 at the right end of the beam 14. The left rail 34 extends between another pair of upright spaced apart plates 44 mounted to the upper side of the frame beam 14 adjacent to and inwardly of the upper draft member mounting plate 22 at the left end of the beam 14. Right and left pivot pins 46, 48 are respectively secured to and extend between the pairs of plates 42, 44 and respectively through right and left rails 32, 34 so as to pivotally mount the rails 32, 34 generally intermediately between their respective opposite ends to respective plate pairs 42, 44 about a generally common horizontal axis defined by the pins 46, 48. The rails 32, 34 in being so mounted are disposed with their respective lower sides spaced above the upper side of the frame beam 14 so as to provide sufficient clearance therebetween for accommodating pivotal movement of each of the rails 32, 34 in a vertical plane with respect to the frame beam 14.

The rails 32, 34 are preferably intended to support a plurality of large round bales extending end-to-end therealong with the longitudinal axis of each bale extending generally parallel to the rails 32, 34. Therefore, since a lower longitudinal portion of each bale, because of its cylindrical shape, extends somewhat downwardly between the rails 32, 34, the rails 32, 34 have a predetermined height designed to allow sufficient clearance between the lower bale portion and the upper sides of the frame beam 14 and the transverse members 36, 38, 40. In effect, an elongated, unobstructed channel or passageway within which the lower bale portion may extend is defined between the rails 32, 34.

Furthermore, it is desirable that the bed assembly 30 can be capable of accommodating round bales having various diameter sizes. The bales presently formed by commercially-available roll balers generally range in diameter size from 4½ to 6 feet. It has been found that bales falling within this diameter size range may be satisfactorily handled by providing the rails 32, 34 of the bed assembly 30 at one of two possible spacings. One spacing is illustrated in FIG. 1 for handling bales at the upper half of this range. The other spacing for handling bales at the lower half of this range is provided by unfastening right pivot pin 46, relocating the right rail 32 to the inner side of the inside plate of the right pair of plates 42 and then relocating the outside plate of the pair 42 on the interior side of the right rail 32. Holes 50 are provided in the beam 14 for mounting the relocated outside plate to the beam 14 with bolts (not shown). Finally, right pivot pin 46 may be refastened through the right plate pair 42 and right rail 32. It is readily apparent that additional space settings for the rails 32, 34 could be provided, if desired.

In order to change the spacing between the rails 32, 34, the transverse members 36, 38, 40 interconnecting them must be adjustable. Therefore, as shown in FIG. 1, each of the transverse members 36, 38, 40 are formed by two separate, telescoping right and left pieces. Each right piece is fixed to the underside of the right rail 32 and each left piece is fixed to the underside of the left rail 34. Holes (not shown) are provided in each right piece which align with holes in each left piece at each of the two space settings of the rails 32, 34. Bolts (not shown) are used to fasten the respective pieces of each transverse member together.

In order to actuate pivotal tilting of the bed assembly 30 relative to the frame 12 and support the bed assembly 30 at any of the positions illustrated in FIGS. 2 through 4, there is provided means, generally indicated by numeral 52, located rearwardly of the frame beam 14.

The means 52 includes a linkage assembly 54 pivotally coupled to the bed assembly 30 and a hydraulic cylinder 56 pivotally coupled between the frame 12 and the linkage assembly 54. The hydraulic cylinder 56 is of the double-acting type and is supplied with fluid under pressure through hydraulic lines (not shown) from any suitable source, such as the tractor hydraulic system.

The linkage assembly 54 is designed to maximize tilting of the bed assembly 30 to its rearwardly and forwardly inclined positions upon extension and retraction of the hydraulic cylinder 56. The assembly 54 includes a pair of rearwardly-diverging lower links 58, a pair of rearwardly-diverging upper links 60 being fixed at their rear ends to the rear ends of the lower links 58, and a pair of straight front links 62 which extends between and are fixed at opposite ends respectively to the forward-converging ends of the lower links 58 and upper links 60.

The linkage assembly 54 is coupled to the bed assembly 30 by a pair of spaced apart links 64 which are pivotally fastened at their upper ends at 66 to the underside of the transverse member 38 and depend therefrom to lower ends which are pivotally fastened at 68 to the respective rear ends of the lower and upper links 58, 60 of the linkage assembly 54.

The linkage assembly 54 is further coupled to the frame 12 by a tapered bracket 70 which is fixed to the upper and rear sides of the frame beam 14, extends generally horizontally and rearwardly therefrom and pivotally mounts at 72 the forward-converging ends of the upper links 60 and the upper ends of the straight front links 62 of the linkage assembly 54.

The hydraulic cylinder 56 is pivotally anchored at its forward cylinder end to a bracket 74 fixed to the rear side of the frame beam 14 and pivotally coupled at its rear piston end at 76 to the rear ends of the lower links 58 and the lower ends of the straight front links 62 of the linkage assembly 54.

It is readily seen in FIGS. 2 through 4 that the linkage assembly 54 swings along a generally vertical arcuate path about stationary pivot point 72 upon extension and retraction of the hydraulic cylinder 56. The angular relationship of the links 64 to the arcuate path of travel of the linkage assembly 54, when the bed assembly 30 is at either its rearwardly inclined position of FIG. 3 or its forwardly inclined position of FIG. 4, is designed to maximize the mechanical advantage of the lifting force being applied by the cylinder 56 to bed assembly 30 through the above-described linkage both as the cylinder 56 extends to or retracts from the FIG. 3 position or retracts to or extends from the FIG. 4 position. Such angular relationship of the links 64 to the arcuate path of travel of the linkage assembly 54 thereby facilitates smooth actuation of the cylinder 56 under maximum load conditions, such as when two bales are supported on the front half of the bed assembly 30 with the assembly 30 in its FIG. 3 position and it is desired to pivotally move the assembly 30 back to its horizontal position of FIG. 2 or such as when two bales are supported on the rear half of the bed assembly 30 with the assembly 30 in its FIG. 4 position and it is desired to pivotally move the assembly 30 back to its horizontal position of FIG. 2.

In order to pick up bales as the apparatus 10 is towed across the field and to move the bales along the rails 32, 34 of the bed assembly 30, there is provided bale delivering means, generally indicated by numeral 78. The means 78 includes a pair of endless flexible members in the form of conveyor chains 80 which each extend along one of the rails 32, 34 and about a rear drive sprocket 82 and a front idler sprocket 84 respectively rotatably mounted at opposite ends of its respective one of the rails 32, 34. An upper course 86 of each conveyor chain 80 runs along a track 88 defined on the upper side of its respective one of the rails 32, 34. A lower course 90 (FIG. 2) of each conveyor chain 80 travels within the hollow interior of its respective one of the rails 32, 34.

Each chain 80 is formed by an endless succession of interconnected links (not shown) and has a bale-engaging lug 92 mounted preferably to every fifth link thereof. Each lug 92 extends above the upper side of its respective one of the rails 32, 34 and also beyond the respective one of the front ends thereof so as to be exposed for engagement with the surface of a bale as the front or bale-receiving ends of the rails 32, 34 are brought into engagement with a bale as the apparatus is towed in the forward direction across the field. In such mounting arrangement of the chains 80 on the rails 32, 34, the bed assembly 30 is provided with what may be termed as a "live" end; that is, the portion of the apparatus 10 which first makes contact with the bale is the ones of the lugs 92 which are passing around the front ends of the rails 32, 34 from the lower chain courses 90 to the upper chain courses 86 as the conveyor chains 80 are moved along a counterclockwise path when viewed as in FIG. 2.

The "live" front ends of the rails 32, 34 and the aggressive nature of the conveyor chains 80, due to the provision of the lugs 92 thereon, allow the bed assembly 30 to "walk" under the round bale resting on the field as the apparatus is towed across the field.

A skid shoe 94 is mounted on each front end of the rails 32, 34 as so to support the front rail end above the field and thereby prevent the "live" front end from digging into the field due to the weight of the bale as the front end of the apparatus 10 is brought into engagement with the bale. A forwardly opening central slot (not shown) is formed in the forwardmost portion of each shoe 94 for allowing passage of the respective one moving conveyor chain 80 and its lugs 92. Also, another skid shoe 95 is mounted on each rear end of the rails 32, 34 for supporting the rear rail end on the field when the bed assembly 30 is tilted to its forwardly inclined position during unloading of bales.

Movement of the conveyor chains 80 is caused by drive means, being generally designated by numeral 96 in FIG. 1, which transmit rotary power preferably from the tractor power takeoff (not shown) to the conveyor chains 80. The drive means 96 includes a reversing gearbox 97 having an input shaft 99 adapted for coupling to the tractor power takeoff, an input drive train, generally designated 98 driven by the output side of the gearbox 97, another gearbox 100 mounted to the exterior side of the rear end of the left rail 34 and operated by the drive train 98, and an output drive shaft 102 rotatably mounted by and extending between the rear ends of the rails 32, 34 and extending from and driven by the gearbox 100. Rear drive sprockets 82, which respectively mount the conveyor chains 80, are secured to the output drive shaft 102 for rotation therewith. The right rear drive sprocket 82 may be adjusted laterally along the output drive shaft 102 toward the left rear drive sprocket 82 upon relocation of the right rail 32 to its above-described second space setting in closer relation to the left rail 34.

The drive train 98 includes a front drive shaft section 104 being rotatably mounted along the draft member 20 and operatively connected at its forward end to the output side of the reversing gearbox 97, and a rear drive shaft section 106 being rotatably mounted along the exterior side of the left rail 34 and drivingly coupled at its rear end to the input side of the gearbox 100. Further, the drive train 98 includes a telescoping drive shaft section 108 located above the upper draft member mounting plate 22 and pivotally and drivingly interconnecting the rear end of the front drive shaft section 104 and the forward end of the rear drive shaft section 106 by front and rear universal joints 110, 112, respectively, to thereby allow universal articulation of the shaft sections 104, 106 relative to each other.

The reversing gearbox 97 allows the conveyor chains 80 to be selectively driven in either a clockwise or counterclockwise direction. An actuating lever 113 is provided on the gearbox 97 for use by the operator in reversing the direction of operation of the gearbox 97.

A shield 114 is illustrated in FIG. 1 attached between the rails 32, 34 so as to overlie the output drive shaft 102 and thereby prevent wrapping of crop material about the shaft 102. Also, additional shields (not shown) may be mounted along the left rail 34 and draft member 20 for enclosing the drive train 98.

Alternatively, the drive means for causing movement of the conveyor chains 80 may take the form of a hydraulic motor disposed in the position of the gearbox 100 and supplied with fluid under pressure through hydraulic lines from any suitable source, such as the hydraulic system of some tractors.

CONVERSION BETWEEN TRANSPORT AND OPERATING POSITIONS

The aforementioned pivotal mounting arrangement of the draft member 20 of the apparatus 10 to the frame 12 allows conversion of the frame 12 and bed assembly 30 between a field or road transporting position generally aligned behind the towing tractor with the bed assembly 30 placed in its horizontal position by the hydraulic cylinder 56, and field operating position generally aligned in offset relation to the right side of the tractor. The solid line location of the draft member 20 in FIG. 1 represents its position with respect to the bed assembly 30 in the road transporting position of the apparatus 10. The broken line location of the draft member 10 in FIG. 1 to the left of its solid line location represents its position with respect to the bed assembly 30 in the field operating position of the apparatus 10. Upon actuation of the hydraulic cylinder 25 so as to cause its extension or retraction, the frame 12 and bed assembly 30 are respectively pivoted relative to the draft member 20 to either the field operating position or the transporting position when the draft member 20 is attached to the towing vehicle. Deactuation of the cylinder 25 after its extension or retraction maintains the frame 12 and bed assembly 30 at either of these positions.

Vertically aligned pairs of holes 116, 118 are provided respectively in the vertically spaced apart draft member mounting plates 22, 23 which will receive a retaining pin (not shown) for assisting in the retention of the draft member 20 respectively in either one of aforementioned two locations after extension or retraction of the cylinder 25.

Figure 6:
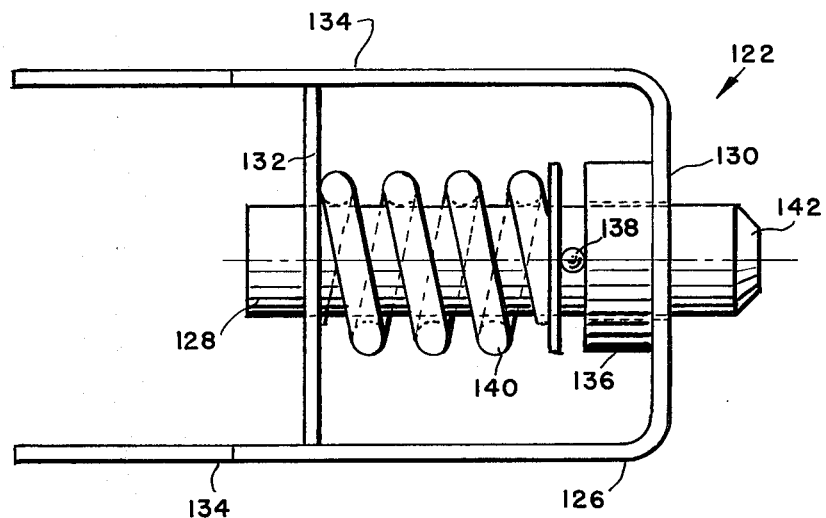
FIG. 6 is a top plan view of the one of the latching elements of FIG. 5 which is carried on the draft member.
Figure 5:
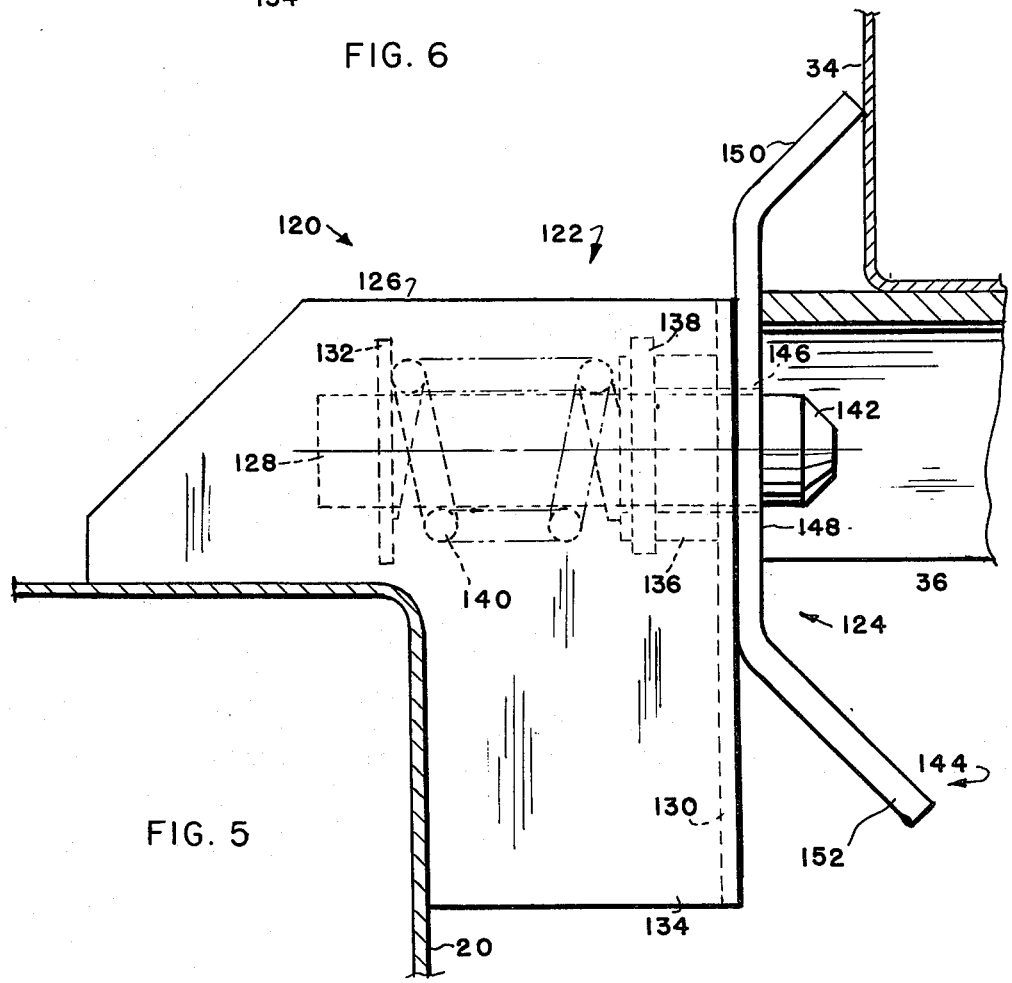
FIG. 5 is an enlarged fragmentary side elevational view taken along line 5—5 of FIG. 1, showing the latching elements respectively carried on the draft member and bed assembly of the apparatus of FIG. 1 with the elements being in mated condition.

In FIG. 1, and in greater detail in FIGS. 5 and 6, there is shown means, generally indicated by numeral 120, for coupling the bed assembly 30 to the draft member 20 when the bed assembly 30 is moved to its transport position and disposed at its horizontal position. The coupling means 120 includes first latch structure 122 mounted on the draft member 20 and second latch structure 124 mounted on the left rail 34 of the bed assembly 30.

The first latch structure 122 includes a U-shaped upright bracket 126 fixed to the right and upper sides of the draft member 20, a plunger 128 horizontally reciprocably mounted through a pair of spaced apart openings respectively formed in the endwall 130 of the bracket 126 and a cross piece 132 fixed to and extending between the sidewalls 134 of the bracket 126. An annular hub 136 formed on the interior side of the endwall 130 surrounds the opening formed in the endwall 130 and also receives the plunger 128. A pin 138 mounted through the plunger 128 limits movement of the plunger 128 toward the endwall 130. A spring 140 extending about the plunger 128 between the cross piece 132 and the pin 138 biases the plunger 128 toward the endwall 130 and normally positions the plunger 128 such that a short portion 142 thereof extends outwardly beyond the exterior side of the endwall 130.

The second latch structure 124 comprises a plate 144 fixed to the left end of the transverse member 36 of the bed assembly 30 which includes a centrally-located slot 146. The slot 146 and the short outer portion 142 of the plunger 128 are aligned when the frame 12 and bed assembly 30 have been moved to the transport position and the bed assembly 30 is disposed in its horizontal position. The plate 144 has a configuration which includes a central, vertically-extending portion 148 which contains the slot 146, an upper portion 150 which extends upwardly and rearwardly at an acute angle to the central portion 148 and a lower portion 152 which extends downwardly and rearwardly at an acute angle to the central portion 148. The aforementioned configuration of the plate 144, the beveled profile of the end of the plunger short outer portion 142 and the spring loaded nature of the plunger 128 facilitate alignment of the plunger 128 with the slot 146 in plate 144 as the bed assembly 30 is brought into both its transport position adjacent the draft member 20 and its horizontal position. Once the plate 144 has been brought into contact with the plunger 128, slight vertical movement of the bed assembly 30 relative to the draft member 20 compresses the spring loaded plunger 128 until the slot 146 is aligned therewith. Once alignment is achieved, the spring 140 causes the plunger 128 to move into the slot 146 in a mated relationship.

Disengagement or unmating of the plunger 128 from the slot 146 is achieved simply by pivoting the bed assembly 30 and frame 12 away from the draft member 20.

Therefore, it is readily seen that the coupling means 120 assists the hydraulic cylinder 56 in stabilizing the bed assembly 30 at its horizontal position during transporting of the apparatus 10 when the bed assembly 30 is loaded with bales.

BALE HANDLING OPERATIONS

FIGS. 7 through 15 schematically illustrate various stages in the bale handling operations performed by the apparatus 10.

FIGS. 7 through 10 illustrate the apparatus set up in field operating position and moving across the field with its frame 12 and bed assembly 30 offset to the right rear side of the towing vehicle (not shown), which would be attached to the forward end of the draft member 20, and the bed assembly 30 rearwardly inclined such that its forward end is disposed adjacent the field. For optimum results the ground speed of the towing vehicle should match the speed of rearward movement of the upper courses of the conveyors chains.

Large round bales are successively picked up from the field by the conveyor chains on the rails of the bed assembly 30 with the longitudinal axis of each bale extending parallel to the forward direction of apparatus movement and to the longitudinal axis of the bed assembly 30. Each bale being picked up, is carried by the upper courses of the conveyor chains along the rails toward the rear end of the bed assembly until the forward end of the bale clears the front end of the bed assembly. Then the operator stops driving the conveyor chains, thereby retaining the bale at such forward location, until the apparatus had advanced to the next bale. The operator again actuates driving of the conveyor chains upon reaching the next bale for picking up the bale as the apparatus continues its forward movement into engagement with the bale. In such manner, the bale previously loaded on the bed assembly will be moved rearwardly through a distance equal to approximately one bale length as the next bale is being loaded onto the bed assembly. By repeating the aforementioned steps, four or five bales, depending on their respective sizes, will be loaded in single file arrangement on the bed assembly.

FIGS. 11 and 12 illustrate the apparatus in a fully loaded condition and after the bed assembly 30 has been returned to its horizontal position in preparation for transporting the bales from the field to a storage area. The draft member 20 is pivoted toward the bed assembly 30 to its solid line location as seen in FIG. 1 to set up the apparatus in road transporting position.

FIGS. 13 and 14 illustrate the apparatus 10 during unloading of bales at either a storage area or back onto the field. The bed assembly 30 has been tilted to its forwardly inclined position such that its rear end is disposed adjacent the ground. The conveyor chains are driven such that their upper courses move rearwardly as the apparatus is moved forwardly which causes the bales to be deposited on the ground in single file fashion with the same outer portion of the bale on which it was originally resting in the field now again in contact with the ground.

FIG. 15 illustrates the apparatus 10 during unloading of the bales onto an elevated storage area or the bed of a wagon or truck. The bed assembly 30 has been tilted to its rearwardly inclined position so as to position its rear end at the elevation of the bale receiving surface. Then the conveyor chains are driven such that their upper courses move rearwardly while the apparatus is maintained stationary which deposits the bales on the elevated surface.

It is thought that the invention and many of its attendant advantages will be understood from the foregoing description and it will be apparent that various changes may be made in the form, construction and arrangement of the parts of the apparatus described without departing from the spirit and scope of the invention or sacrificing all of its material advantages, the form hereinbefore described being merely a preferred or exemplary embodiment thereof.

Having thus described the invention, what is claimed is:

1. An apparatus for handling crop material packages, such as large round bales or the like, comprising:
 a transverse mobile frame adapted for movement across a field;
 an elongated bed assembly mounted generally intermediately between its opposite ends to said frame at a position spaced above the field;
 means for tilting said bed assembly about a horizontal axis relative to the field between a generally horizontal position and an inclined position in which one end of said bed assembly is disposed adjacent the field, said tilting means further for supporting said bed assembly at said positions relative to the field;
 an elongated draft member pivotally interconnected at one end to said frame for lateral movement toward and away from one side of said bed assembly between a transport position in which a portion of said draft member is disposed closely adjacent said side of said bed assembly and a field operating position in which said portion of draft member is laterally offset from said side of said bed assembly, said draft member being adapted at the other end for attachment to a vehicle for towing said apparatus across the field; and
 means for coupling said side of said bed assembly and said portion of said draft member together when said bed assembly and draft member are disposed at said transport position and said bed assembly is disposed at its horizontal position, said portion of said draft member and said side of said bed assembly being uncoupled when said draft member is disposed at said field operating position.

2. The apparatus as recited in claim 1, further comprising:
 means movably mounted on said bed assembly for delivering a bale or the like from the field to said end thereof when said bed assembly is disposed at its inclined position and said bed assembly and draft member are disposed at said field operating position;
 an input drive train having a forward end to which is transmitted rotary power from an external source, such as from a power takeoff source of the towing vehicle, said drive train being rotatably mounted along said draft member and along a rearward portion of said side of said bed assembly, said drive train being flexible for accommodating relative pivotal movement between said draft member and said bed assembly; and
 means mounted at a rear end of said bed assembly for drivingly interconnecting said movable means on said bed assembly and a rear end of said drive train.

3. The apparatus as recited in claim 2, wherein said drive train includes:
 a first drive shaft section rotatably mounted to said draft member and extending longitudinally therealong;
 a second drive shaft section rotatably mounted to said rearwardly-extending bed assembly side portion and extending longitudinally therealong; and
 means drivingly interconnecting said first and second drive shaft sections and providing for universal articulation of said sections relative to each other.

4. The apparatus as recited in claim 1, wherein said coupling means includes:
 first latch structure mounted on said portion of said draft member; and
 second latch structure mounted on said side of said bed assembly, said latch structures being matable when said bed assembly is disposed at its horizontal position and said bed assembly and draft member are moved to said transport position and being unmatable upon relative movement of said bed assembly and draft member away from said transport position.

5. The apparatus as recited in claim 1, further comprising:
 power means for effectuating lateral movement of said draft member toward and away from said one side of said bed assembly between said transport and field operating positions thereof.

6. An apparatus for handling crop material packages, such as large round bales or the like, comprising:
 a transverse mobile frame adapted for movement across a field;
 an elongated bed assembly pivotally mounted about a generally horizontal axis generally intermediately between its opposite ends to said frame;
 an elongated draft member pivotally interconnected at one end to said frame for lateral movement toward and away from said bed assembly and adapted at the other end for attachment to a vehicle for towing said apparatus across the field; and
 means for pivotally tilting said bed assembly about said horizontal axis relative to said frame between a generally horizontal position and an inclined position in which one end of said bed assembly is disposed adjacent the field, said tilting means further for supporting said bed assembly at said positions relative to said frame, said tilting means including support means fixed on said frame and extending therefrom to an outer end, linkage structure pivotally secured to said outer end of said support means, link means pivotally secured at one end to said bed assembly and at the other end to said linkage structure, and power means pivotally mounted at one end to said frame below said support means and at the other end to said linkage structure, said linkage structure being caused to swing along a generally vertical arcuate path about its pivotal securement with said support means outer end upon actuation of said power means and thereby via said link means cause pivotal tilting of said bed assembly about said horizontal axis relative to said frame between its horizontal and inclined positions.

7. The apparatus as recited in claim 6, further comprising:
   means movably mounted on said bed assembly for delivering a bale or the like from the field to said one end thereof when said bed assembly is disposed at its inclined position;
   said means for pivotally tilting said bed assembly about said horizontal axis relative to said frame is further capable of pivotally tilting said bed assembly to an oppositely inclined position in which the opposite end thereof is disposed adjacent the field and of supporting said bed assembly at said position; and
   said movable means on said bed assembly is further capable of delivering said bale or the like from one of said ends of said bed assembly to the field when said bed assembly is disposed at one of its said inclined position, opposite inclined position and horizontal position.

8. The apparatus as recited in claim 6, further comprising:
   second power means pivotally mounted at one end to said frame and at the other end to said draft member, said power means for causing, upon actuation thereof, relative pivotal movement of said bed assembly and draft member between said field operating position and said transport position.

* * * * *